May 23, 1961

W. L. HATTON 2,985,836

SLICING CIRCUITS

Filed May 2, 1958

INVENTOR
WILLIAM L. HATTON
BY H. Vincent Harsha
ATTORNEY 2,985,836

SLICING CIRCUITS

William L. Hatton, Wellesley Hills, Mass., assignor to Raytheon Company, a corporation of Delaware Filed May 2, 1958, Ser. No. 732,678

6 Claims. (Cl. 328—54)

This invention relates to electronic pulse shaping circuits and more particularly pertains to a slicing circuit which permits only an intermediate portion of an input pulse or waveform to be reproduced at the output. A circuit which performs this function is also known as a gate clipper or limiter-clipper circuit..

It is well-known in the electronic art that one of the important uses of a slicing circuit is to change a waveform to another shape. An essentially trapezoidal pulse, for example, may be obtained from a sine wave by utilizing a slicing circuit. The rise time, duration, decay time, and amplitude of the pulse obtained at the output of a slicing circuit depend on the limiting and clipping levels. When both limiting and clipping levels are close to the top of a sine wave, a trapezoidal pulse of short duration is obtained. As these levels are both dropped toward the zero reference level of the sine wave, the output pulse duration increases. Hence, by raising or lowering the limiting and clipping levels, the duration of the output pulse is regulated. By increasing or decreasing the interval between limiting and clipping levels the amplitude of the output pulse is regulated. The slicing circuit is employed to pass only that portion of an input pulse or wave form which lies between voltage levels which are preset, and because of this ability the slicing circuit is also useful where it is desired to pass only the portion of a received pulse which most faithfully represents the original pulse transmitted from a remote station. A specific instance of such use is in pulse position modulation systems where information is transmitted by a train of pulses, the information being conveyed by the positions which the pulses occupy. In a pulse position modulation system, it is a desideratum that the transmitted pulses be received in their original form because distortion of the pulses degradates their positional information. The entire form of a pulse need not be reproduced, however, since a portion of a pulse can accurately define the position of the entire pulse. Because portions of the transmitted pulse tend to become distorted during transmission, a slicing circuit may be employed at the receiver to permit entry of only that portion of the received pulse which is undistorted. For example, if it is found that a portion of a pulse lying between 60% and 80% of the peak pulse voltage tends to remain undistorted, a pulse slicing circuit may be utilized at the receiver to gate through only that portion of the received pulse which lies between 60% and 80% of the peak pulse voltage.

The invention resides in a circuit that will take a slice from reiterated pulses or waveforms at a fixed amplitude relative to the peak voltage.The operation of the novel circuit is independent of the number of pulses or waveforms which occur during a unit of time and the circuit will operate satisfactorily even if a variable number of pulses or waveforms occur per unit of time. An important feature of the invention is that the slice will be taken at a fixed amplitude relative to the peak voltage, for example 60% of the peak voltage, and if the peak voltage should change to a different value, the circuit will automatically adjust itself to take a slice at 60% of the new peak voltage.

The novel circuit includes a network for rectifying input pulses and for filtering the rectified voltage to reduce its ripple. A portion of the filtered rectified voltage is impressed upon the input of a cathode follower stage and the voltage at the cathode of this stage is employed to bias a diode so that the diode will conduct when the voltage of an input pulse exceeds the level determined by the cathode voltage. Upon conduction of the diode, the input pulse is gated through to the control grid of an amplifying tube, this latter tube being biased to cut off when the voltage of the gated pulse exceeds a predetermined level. By this arrangement only that slice or portion of the input pulse lying between the voltage at the cathode of the cathode follower and the grid voltage required to cut off the amplifying tube is reproduced at the output of the circuit.

The invention can be better apprehended from a consideration of the following detailed description when taken in conjunction with the accompanying drawings wherein.

Figure 3:
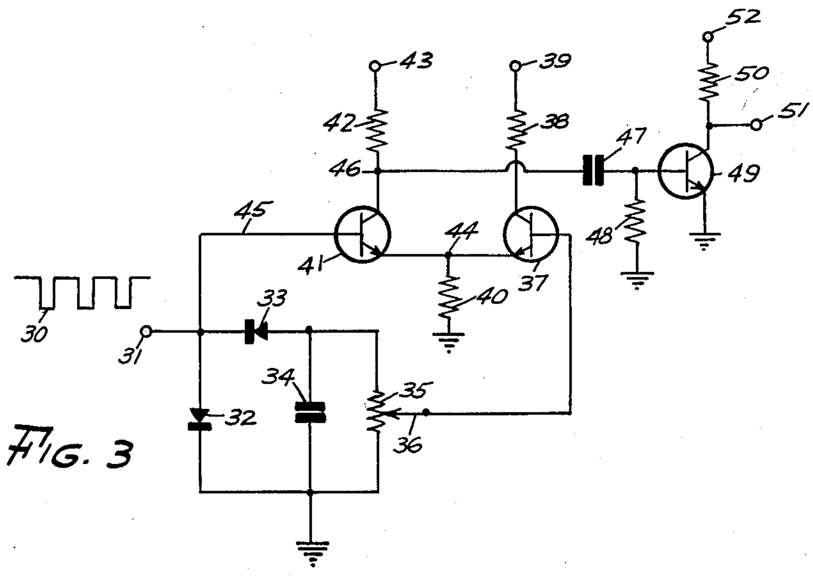

Fig. 3 schematically depicts a modification of the invention employing transistors.

Figure 1:
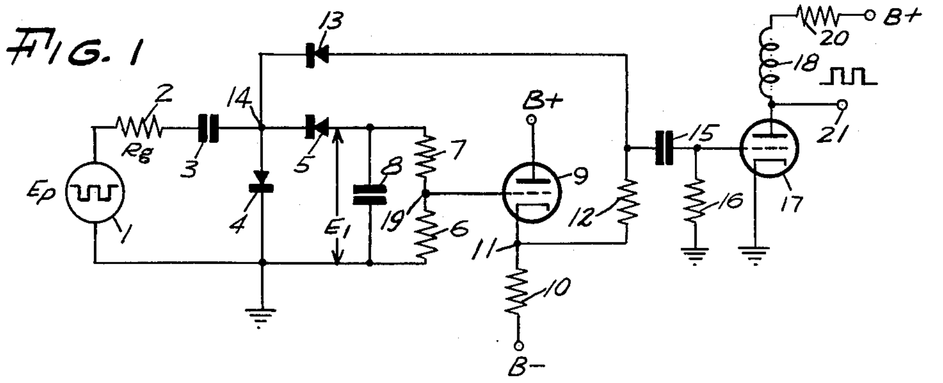
Fig. 1 is a schematic showing of a preferred embodiment of the invention.

Referring now to Fig. 1 which is a schematic illustration of a preferred form of the invention, there is shown a source of negative going pulses represented by a signal generator 1 having an internal impedance $R_g$ symbolized by the resistance 2. The negative going pulses emanating from the signal source are impressed through a coupling capacitor 3 across a diode 4 which clamps the baseline of the pulses to a reference potential here represented as ground potential. The negative going pulses are rectified by the diode 5 which causes a voltage equal to the peak voltage $E_p$ of the pulse train to appear across the series connected resistors 6 and 7 and across a storage capacitor 8 which is connected in parallel with resistors 6 and 7. The storage capacitor smooths out the ripple in the rectified voltage $E_1$. A fraction of the rectified voltage $E_1$ is applied by the voltage divider constituted by resistors 6 and 7 to the grid of tube 9 which tube is arranged as a cathode follower. The cathode load, represented by a resistor 10, has one end connected to a source of potential which is below ground potential. The plate of tube 9 is connected to a source of potential which is positive with respect to ground potential. The values of the applied potentials are chosen so that in the quiescent condition, that is in the absence of input signals $E_p$ and with capacitor 8 discharged, the potential at the cathode junction 11 is substantially equal to ground potential. A resistor 12 and a diode 13 are connected in series between the cathode of tube 9 and junction 14. The junction 14 is therefore effectively clamped to the potential existing at the cathode of tube 9 and for this reason the diode 13 will not permit current to be drawn through it until the voltage of the input pulses exceeds the voltage at the cathode of tube 9. A coupling capacitor 15 is connected between grid resistor 16 and resistor 12. A tube 17 having its control grid connected to the junction of capacitor 15 and resistor 16 acts to clip the peaks of the input pulses. The anode of the tube is connected to a source of potential through an inductor 18, which improves the high frequency response, and a load resistor 20. The tube 17 is arranged to be cut off at a voltage which is more negative than that at which diode 13 starts conducting. The output of the slicing circuit is taken from the plate of tube 17 through terminal 21.

It can be apprehended by those familiar with electronic circuitry that if the combined resistance of resistors 6 and 7 is sufficiently larger than the internal impedance 2 ($R_g$) the rectified voltage $E_1$ will equal the peak voltage $E_p$ of the pulse train. This is shown by the approximate relation:

$$\frac{E_1}{E_p}\approx\frac{1}{1+\frac{T_0}{T}\frac{R_g}{R_1+R_2}}$$

where $T_0$ is the time between pulses
T is the length of the pulse

For example, where the maximum anticipated value of $$\frac{T_0}{T}$$

is 100, a value for $$\frac{R_g}{R_1+R_2}$$

of .001 will hold the deviation of $E_1$ from $E_p$ to 10%. Due to the small values required for $$\frac{R_g}{R_1+R_2}$$

$R_1$ and $R_2$ usually turn out to be very high.

Figure 2:
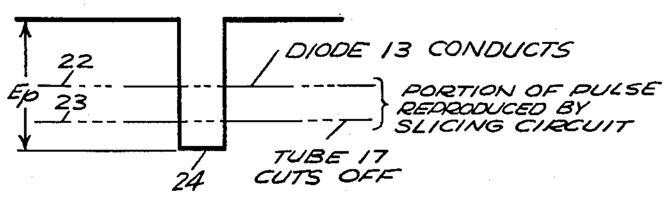
Fig. 2 depicts the clipping and limiting levels in relation to a waveform.

When a train of input pulses is applied through capacitor 3, the baseline of the pulse train is clamped to ground potential by diode 4 and the input pulses cause a rectified current to flow through diode 5 and a voltage to appear across resistors 6 and 7. The storage capacitor 8 immediately charges to the voltage across resistors 6 and 7. During the interval $T_0$ between successive pulses the capacitor 8 tends to discharge through resistors 6 and 7 but the time constant of the discharge path is relatively long due to the high values of resistance so that capacitor 8 tends to retain its charge during $T_0$. Hence the capacitor 8, though it does discharge slightly during the interval $T_0$, tends to remain charged to somewhat near the peak rectified voltage $E_1$. When capacitor 8 discharges through resistors 6 and 7, the junction 19 is caused to drop in potential thereby causing a decrease in conduction through the tube 9 and consequently a drop in potential at the cathode of tube 9. Now the voltage at junction 14 must drop below the voltage at junction 11 in order to cause diode 13 to conduct current. When, due to an input pulse, the voltage at junction 14 becomes sufficiently negative, diode 13 conducts and because the voltage drop across diode 13 is small, the remainder of the voltage input pulse existing at junction 14 is effectively impressed through coupling capacitor 15 on the control grid of tube 17. In the quiescent condition, the grid of tube 17 is at ground potential so that current is flowing to the plate and a voltage drop exists across load resistor 20. The tube is arranged so that it cuts off when its grid swings negative by a predetermined amount, for example, the tube may be arranged to cut off when its grid becomes five volts negative. Due to the action of coupling capacitor 15 in removing the D.C. component of applied pulses, the tube 17 will cut off when, in the example chosen, the voltage at junction 14 drops more than five volts below the value at which diode 13 conducts. When tube 17 is cut off, any further drop in the voltage at junction 14 serves merely to charge capacitor 8 to the peak pulse voltage and does not affect the waveform at the output. Referring now to Fig. 2, the portion of an input pulse 24 lying between the voltage level 22 at which diode 13 conducts and the level 23 at which tube 17 cuts off is reproduced amplified at the plate of tube 17 and the output of the slicing circuit is taken from terminal 21. Because of the circuit arrangement the voltage level 23 is related to and in part determined by the voltage level 22 at which diode 13 conducts. If the level 22 is altered, for example by changing the value of resistors 6 and 7, the level 23 will shift by an equal amount in order to maintain the voltage difference between levels 22 and 23 unchanged. To illustrate, where the difference between levels 22 and 23 is five volts and level 22 is set at 50% of the peak voltage $E_p$, an adjustment shifting the level 22 to 60% of $E_p$ will automatically cause level 23 to change so that it is five volts below level 22.

From the description above it can be seen that input pulses having a peak voltage $E_p$ cause storage capacitor 8 to charge to $E_1$, where $E_1\approx E_p$, that because of a long time constant discharge path the capacitor 8 tends to retain its charge during the interval between successive input pulses, that a portion of the charge on capacitor 8 is impressed on the control grid of tube 9 in a cathode follower stage, thereby determining the voltage at the cathode of that tube, that the voltage at the cathode of tube 9 determines the voltage at which diode 13 conducts, that the voltage at which diode 13 conducts in turn determines a voltage level 22 which an input pulse must exceed in order to be gated through to the control grid of amplifying tube 17, that amplifying tube 17 is arranged to cut off at a voltage level 23 which is related by a constant voltage difference to voltage level 22, and that the output of the circuit is taken from the plate of the amplifier tube. The peak pulse voltage $E_p$ through the foregoing sequence of events thereby determines the gating level and the portion of the pulse which is reproduced at the output of the slicing circuit.

It should be noted that the preferred embodiment of the invention shown in Fig. 1 is designed to accept only negative input pulses. Where the input signals consist of a train of positive pulses an inverter stage may readily be interposed between the source of input signals and the slicer circuit to cause the input signals to have the desired negative polarity.

A circuit constructed in accordance with Fig. 1 has been employed to slice a train of negative rectangular pulses, the peak pulse amplitude of the train being thirty volts and each pulse having a duration of one half microsecond. A five volt slice was taken from each input pulse and the slice was reproduced at the output as a rectangular pulse having an amplitude of about twenty volts. The following values of circuit components are given by way of example only, since the values of components may obviously be changed to suit specific requirements for the circuit:

| | |
|---|---|
| Tube 9 | ½ 12AT7 |
| Tube 17 | ½ 12AT7 |
| Diode 13 | IN460 |
| Diode 5 | IN460 |
| Diode 4 | IN67 |
| Resistor 6 | 3.3 megΩ |
| Resistor 7 | 4.7 megΩ |
| Resistor 10 | 33 KΩ |
| Resistor 12 | 20 KΩ |
| Resistor 16 | 470 KΩ |
| Resistor 20 | 2700 Ω |
| Capacitor 3 | .01 μf. |
| Capacitor 8 | .01 μf. |
| Capacitor 15 | .005 μf. |
| Inductor 18 | 24 μh. |

Fig. 3 schematically illustrates a modification of the invention which employs transistors rather than vacuum tubes. The input signals 30 are indicated as a train of pulses which are applied to terminal 31. The base line of the pulse train is clamped at ground potential by the diode 32. The pulses in the train are rectified by diode 33 and the rectified voltage is filtered by an R-C network formed by capacitor 34 and potentiometer 35. The movable tap 36 of the potentiometer is connected to the base of an NPN transistor 37 which has its emitter grounded through resistor 40 and its collector connected through a load resistor 38 to a source of potential applied at terminal 39. A second NPN transistor 41 is arranged so that its emitter is connected to ground through resistor 40, its collector is connected through a load resistor 42 to a source of potential 43, and its base is connected to the input terminal 31. A third transistor 49 has its base coupled through a condenser 47 to the collector of transistor 41 at junction 46. The output of the circuit is derived through output terminal 51 from the collector which is connected to a source of potential 52 through load resistor 50. The emitter of transistor 49 is connected to ground and a resistor 48 connects the base of transistor 49 to ground.

The signal applied to the base of transistor 37 through the potentiometric tap 36 causes a current to flow between emitter and collector in that transistor and through the resistor 40 causing the junction 44 to fall below ground potential by an amount which is dependent on the applied signal. The potential at junction 44 causes the transistor 41 to be held at collector cut off until the potential at input terminal 31 drops below the level of potential at junction 39 and when that condition occurs, current flows between emitter and collector of transistor 41 causing an amplified signal to appear at 46 which is coupled through capacitor 47 to the base of transistor 49. The transistor 49 is arranged to be normally conducting and when the signal at junction 46 falls below a preset value of voltage, transistor 49 is caused to be driven to collector cut off. The pulse which is obtained at output 51, therefore, represents a slice of an input pulse lying between the level set by the voltage at junction 44 and the level at which transistor 49 cuts off. In lieu of arranging transistor 49 to be cut off by signals from junction 46, transistor 49 can be arranged to be driven to saturation by signals from junction 46. The polarity of the output signals which it is desired to obtain from the slicing circuit, would govern the choice of whether to use a cut-off amplifier or a saturated amplifier for the last stage.

The embodiments of the invention illustrated in Figs. 1 and 3 may be modified in various ways without departing from the essence of the invention. It is therefore intended that the scope of the appended claims shall be construed to cover any such modifications as come within the true spirit of the invention.

What is claimed is:

1. An electronic circuit comprising a signal input terminal, an amplifier having a control circuit, a unidirectionally conductive device connected from said input terminal to the control circuit of said amplifier, means connected to said input terminal for deriving a rectified voltage from input signals, means responsive to said rectified voltage for generating a biasing signal, means for applying said biasing signal to said device, said device being rendered conducting when the input signal voltage exceeds a level established by said biasing signal, and means for obtaining output signals from said amplifier.

2. An electronic circuit comprising a signal input terminal, a rectifier connected to said terminal, a storage capacitor connected to said rectifier and adapted to be charged to the peak voltage of said input signals, resistance means shunting said capacitor, a cathode follower stage, means connecting the control circuit of said stage to said resistance means, a unidirectionally conducting device connected between the cathode of said stage and said signal input terminal, an amplifying stage having its control circuit coupled to said device whereby upon conduction of said device the amplifier control circuit is electrically coupled through said diode to said input terminal.

3. An electronic circuit comprising a signal input terminal, an amplifier having a control circuit and an output circuit, a unidirectionally conductive device connected from said input terminal to said amplifier control circuit, means connected to said input terminal for deriving a rectified voltage from input signals, means responsive to said rectified voltage for generating a biasing signal, means for applying said biasing signal to said device to cause said device to remain non-conducting until the input signal voltage exceeds a level determined by said biasing signal, and means for biasing said amplifier to cause said amplifier to reproduce a portion of the input signals impressed through said device on said amplifier control circuit.

4. An electronic pulse slicing circuit comprising a rectifier for rectifying input signals, a capacitor connected to said rectifier for storing the rectified current, resistance means shunting said capacitor, a cathode follower stage having its control circuit connected to said resistance means, a unidirectionally conductive device on which said input signals are impressed, means for connecting the output of said cathode follower to said device to cause said device to conduct only when the voltage level of an input signal exceeds a value determined by said output, an amplifier having its control circuit coupled to said device so that upon conduction of said device an input signal is impressed on said amplifier control circuit, and means for biasing said amplifier to cause said amplifier to reproduce a portion of the input signal impressed on its control circuit.

5. An electronic pulse slicing circuit comprising a source of input signals, a rectifier coupled to said source for rectifying input signals, a capacitor connected to said rectifier for storing the rectified current, resistance means shunting said capacitor, a vacuum tube having a cathode, control grid, and anode, said control grid being connected to said resistance means, a load impedance connected to said cathode, a diode interconnecting said cathode and said source whereby said diode conducts only when the voltage level of an input signal exceeds the voltage at said cathode, an amplifier having its control circuit coupled to said diode so that upon conduction of said diode an input signal is impressed on said amplifier control circuit, and means for biasing said amplifier to cause said amplifier to be cut off when an input signal exceeds a predetermined voltage.

6. An electronic pulse slicing circuit comprising an input signal terminal, a rectifier connected to said terminal, a capacitor in series with said rectifier for storing the rectified current, resistance means shunting said capacitor, a first transistor having its base connected to an intermediate point of said resistance means, a second transistor having its base connected to said terminal, a load resistor having one end thereof connected to the emitters of said first and second transistors, an amplifier having its control circuit coupled to the collector of said second transistor so that upon conduction in said second transistor an input signal is impressed on said amplifier control circuit, and means for biasing said amplifier to cause said amplifier to reproduce a portion of the input signal impressed on its control circuit.

References Cited in the file of this patent

UNITED STATES PATENTS

| | | |
|---|---|---|
| 2,265,883 | Applegarth | Dec. 9, 1941 |
| 2,298,084 | Fyler | Oct. 6, 1942 |